United States Patent
Aboul-Magd et al.

(10) Patent No.: US 6,490,249 B1
(45) Date of Patent: Dec. 3, 2002

(54) ADAPTIVE CONNECTION ADMISSION CONTROL SCHEME FOR PACKET NETWORKS

(75) Inventors: Osama S. Aboul-Magd, Kanata (CA); Sameh A. Rabie, Kanata (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/203,104

(22) Filed: Dec. 1, 1998

(51) Int. Cl.$^7$ .................. G01R 31/08; G06F 11/08; G08C 15/00; H04J 1/16; H04J 3/14; H04L 1/00; H04L 12/26; H04L 12/28; H04L 12/56
(52) U.S. Cl. .................. 370/232; 370/395.2
(58) Field of Search .................. 370/229, 230, 370/232, 395.1, 395.2, 395.21

(56) References Cited

U.S. PATENT DOCUMENTS 5,982,748 A * 11/1999 Yin et al. .................. 370/232

FOREIGN PATENT DOCUMENTS

| EP | 0 862 299 A2 | 9/1998 |
| WO | WO 98 26612 | 6/1998 |

OTHER PUBLICATIONS

B. Jamoussi, et. al., "Performance Evaluation of Connection Admission Control Techniques in ATM Networks", IEEE Globecom Conference 1996; pp. 1–6.

B. Jamoussi et. al., "System and Method for a Connection Admission Control Scheme in a Multi–Service ATM Networks", Patent Application; Sep. 29, 1997; Ser. No. 08/939, 837; pp. 1–42.

P. White and J. Crowcroft, "The Integrated Services in the Internet: State of the ART", IEEE Proceedings, Dec. 1997; vol. 85, No. 12; pp. 1934–1946.

R. Braden et. al., "Resource Reservation Protocol (RSVP)—Version 1 Functional Specifications", RFC 2205, Sep. 1997; pp. 1–111.

The ATM Forum, Private Network–Network Interface Specifications, Version 1.0 (PNNI 1.0), Mar. 1996; pp. 1–366.

The ATM Forum, User Network Interface (UNI) Signaling Specifications, Jul. 1996; pp. 1–129.

Jamoussi B Et Al: "Performance Evaluation of Connection Admission Control Techniques in ATM Networks" Global Telecommunications Conference (Globecom), U.S., New York, IEEE, 1996, pp. 659–664, XP00074224 ISBN.

* cited by examiner

Primary Examiner—Kwang Bin Yao
Assistant Examiner—Kevin C. Harper
(74) Attorney, Agent, or Firm—Gibbons, Del Deo, Dolan, Griffinger & Vecchione

(57) ABSTRACT

An adaptive method and apparatus for regulating connection admission of traffic for networks, which includes a limiter that limits a volume of traffic admitted to a network through a connection admission control (CAC) procedure; and basing the connection admission control procedure at least in part on a pure measurement CAC that is solely based on measurements of actual traffic levels on the network. The connection admission control is based both on the pure measurement-based CAC and on a pure mathematical-based CAC that is solely dependent on user-supplied traffic parameters, thereby combining both types of the CAC to form a hybrid admission criterion. Where the network offers different services, managing link resources for CAC is effected by regulating the CAC procedure based on capacities assigned to service bandwidth pools that are defined for the different services offered by the network. The CAC procedure may take place on a virtual network (VN) environment.

22 Claims, 7 Drawing Sheets

Figure 2a

Utilization

High activity period

Low activity period

Time of day

Figure 2b

Available Bit Rate

Measurement CAC

Static CAC

Admission Region

Virtual Network architecture

ADAPTIVE CONNECTION ADMISSION CONTROL SCHEME FOR PACKET NETWORKS

CROSS-REFERENCE TO RELATED PATENT APPLICATIONS

Ser. No. 08/723,649, filed Oct. 3, 1996 entitled ADMISSION CONTROL IN AN ATM SWITCHING MODE, to Beshai et al. Ser. No. 08/939,837, filed Sep. 29, 1997, entitled SYSTEM AND METHOD FOR A CONNECTION ADMISSION CONTROL SCHEME IN A MULTI-SERVICE ATM NETWORK, to Jamoussi, et al. The subject matter of each is incorporated herein by reference.

BACKGROUND OF THE INVENTION

Packet networks that offer their users certain level of performance usually require a set of traffic management capabilities. Among this set of capabilities, admission control plays a key role in limiting the volume of the traffic admitted to the network hence facilitate the support of QoS (Quality of Service) by the network.

The admission control function is often performed based on some expectation of the user's traffic profile. This profile is supplied to the network at the set up phase in the form of a limited set of traffic characteristics such as peak rate, sustained rate, and burst size. The values assigned to this set of traffic characteristic are often based on the user's best guess or some default values supplied by the manufacturers or the service providers or both. Consequently these values may bear little resemblance to the actual user activity and traffic pattern. Furthermore, the user is seldom active all the time, sending continuous traffic stream at the above rates, which causes a further diversion between the actual and the nominal traffic values.

An admission control procedure that is solely based on the supplied traffic parameters is usually referred to as mathematical CAC (connection admission control). A mathematical CAC usually leads to a network that is either over-utilized, hence is not able to guarantee the QoS parameters to its users, or a network that is under-utilized, hence not able to maximize its revenue. In most cases the latter case would prevail because of the tendency of the user to assign conservative values to their traffic parameters. Service providers usually compensate for the over-allocation of resources by introducing an overbooking factor that allows better utilization of their network resources.

It is therefore desirable to implement CAC procedures that take into account the current network status based on actual measurements. Since CAC procedures are different for the different services, it is also necessary to dynamically partition the network resources among the different services and virtual networks (customer networks running on a common service provider infrastructure) supported by the network.

The text of the ensuing description makes reference to the following documents by identifying the numeral associated with the corresponding reference as found to the left hand side below.

[1] R. Braden et. Al., "Resource Reservation Protocol (RSVP)—Version 1 Functional Specifications", RFC 2205, September 1997.

[2] The ATM Forumn, User Network Interface (UNI) Signaling Specifications, February 1996.

[3] B. Jamoussi et. al., "System and Method for a Connection Admission Control Scheme in a Multi-Service ATM Networks", Patent application, September 1997.

[4] B. Jamoussi, et. al., "Performance Evaluation of Connection Admission Control Techniques in ATM Networks", IEEE Globecom Conference 1996.

[5] P. White and J. Crowcroft, "The Integrated Services in the Internet: State of the ART", IEEE Proceedings, December 1997.

[6] ATM Forum, P-NNI Specification, 1995.

The CAC function plays an essential role for networks supporting some level of service guarantee for its customers. The first step of the CAC procedure is the reception of the connection establishment message containing the necessary information (traffic and QoS parameters) for the network to execute the mathematical CAC. The outcome of this step is the computation of the EBR (equivalent bit rate).

The EBR is combined in a certain fashion with the network measurements in order to formulate the admission criterion, taking into account the bandwidth assigned to the particular service class. The development of an EBR algorithm requires the mapping of the traffic parameters to an adequate statistical model and assumptions regarding the architecture of the transmission scheduler of the node and the size of the available buffer.

For the CBR (constant bit rate) and premium services where the traffic peak rate is of paramount importance, the traffic parameter of interest to the EBR algorithm is usually the traffic peak rate. For VBR (variable bit rate) services, the traffic parameters of interest are the peak rate, the average rate, and the burst size.

For CBR-like services, the easiest way to compute the EBR is to set its value equal to the connection's peak rate. This is particularly true if the node is equipped with sufficient buffer and the cell delay variation tolerance of the input scheme is small. More elaborate schemes are also possible [3].

For VBR-like service, one EBR algorithm that has seen wide use is the EGH (extended Gibbens-Hunt) algorithm [4]. EGH algorithm assumes a FIFO (first-in-first-out) scheduler for the node and an aggregate buffer of size B. The EGH algorithm maps the input traffic parameters to a two-state Markov-fluid model where a source alternates between active and idle states with exponentially distributed periods with parameters $\alpha$ and $\beta$ respectively. While being active, traffic is assumed to be generated with rate $\lambda$ units/s. With those assumptions, the EBR computed using the EGH algorithm for ATM-based networks is given by $$EBR = \frac{-[\alpha + \beta - \gamma\lambda] + \sqrt{[\alpha + \beta - \gamma\lambda]^2 + 4\gamma\beta\lambda}}{2\gamma}$$

Where $\gamma = -\log(CLR)/B*Pr[W>0]$, and CLR is the QoS parameter in terms of cell loss rate, B is the buffer size available at the node, and P[W>0] is the probability that the combined rate of the active sources exceeds the link capacity (probability of a non-empty queue).

Obviously the EGH algorithm is a loss-based algorithm in the sense that it is only applicable when the loss rate is the QoS parameter of interest. In many cases delay is the parameter of interest and the CAC procedure should be performed in a way to guarantee an upper bound on the delay experienced by a flow. An example of such service is the guaranteed service proposed for the Internet [5]. For the delay-dominated services, the EBR could be computed from [5]

$$Delay = \frac{(b-M) \times (p-EBR)}{EBR(p-r)} + \frac{M + C_{tot}}{EBR} + D_{tot}$$

where r and b are the rate and the depth of a token bucket characterizing the envelope of the flow, M is the maximum packet size, and $C_{tot}$ and $D_{tot}$ are error terms related to the scheduler and the finite packet sizes that are being dealt with.

An essential requirement of a signaling protocol used is its ability to provide, in addition to other information, the capability to carry the traffic and the QoS parameters requested by the user.

Instances of signaling protocols that satisfy those requirements are the RSVP protocol [1] for the Internet (IP-based networks) and UNI (user-network interface) and P-NNI signaling [2] for ATM (asynchronous transfer mode) networks. In RSVP signaling, traffic parameters are carried in the T_spec field of the protocol and the results of the reservation procedures are carried in the R_spec field of the protocol. In UNI and P-NNI signaling, both the traffic and QoS parameters in terms of loss ratio and delay bounds are carried as IE (information elements) of the signaling protocol.

An example of routing protocols is the P-NNI (private network-to-network interface) of the ATM Forum [6] where the source node gathers the link state information advertised by the routing protocol to perform what is referred to as GCAC (generic CAC). The main function of the GCAC is to verify that an end-to-end path with sufficient resources will likely exist before performing the actual CAC on a link-by-link basis.

SUMMARY OF THE INVENTION

This invention describes a method and procedures of a hybrid CAC function that combines both the mathematical and the measurement aspects of the traffic. CAC functions based on some form of measurements is usually referred to as measurement-based CAC. Measurement-based CAC allows better utilization of network resources since the admission decision is based on knowledge of the network's state.

One major advantage of the proposed hybrid approach that combines mathematical-based and measurement-based CAC is its ability to guard against those ID periods of time where the activity on the network in terms of its utilization is low. During those periods a large number of flows could be admitted to the network and remain idle. A congestion state is inevitable when those connections suddenly turn active. This situation could happen when users sign on at 8:00 a.m., but generate traffic at the peak rate two hours later, or for permanent virtual connections which typically generate no traffic at the time of their activation.

This invention also proposes a novel method for the resource assignment to the different services the network offers. This proposed resource assignment is made possible by the introduction of the bandwidth pools. Pools are defined for the different services and the admission decision is regulated based on the capacity assigned to each service pool. The introduction of the bandwidth pools makes the proposed CAC scheme independent of the actual transmission scheduler of the node.

This invention also addresses the issue of sharing the resource of a virtual networks supported on top of the physical network. This invention introduces a CAC methodology for the support of virtual private networks.

One aspect of the invention reside in an adaptive method and apparatus for regulating connection admission of traffic for networks, which includes a limiter that limits a volume of traffic admitted to a network through a connection admission control (CAC) procedure; and basing the connection admission control procedure at least in part on a pure measurement CAC that is solely based on measurements of actual traffic levels on the network. The connection admission control is based both on the pure measurement-based CAC and on a pure mathematical-based CAC that is solely dependent on user-supplied traffic parameters, thereby combining both types of the CAC to form a hybrid admission criterion. Where the network offers different services, managing link resources for CAC is effected by regulating the CAC procedure based on capacities assigned to service bandwidth pools that are defined for the different services offered by the network. The CAC procedure may take place on a virtual network (VN) environment.

BRIEF DESCRIPTION OF THE DRAWINGS

For a better understanding of the present invention, reference is made to the following description and accompanying drawings, while the scope of the invention is set forth in the appended claims.

FIGS. 2a and 2b are timing diagrams illustrating of high and low activity periods.

DETAILED DESCRIPTION OF THE PREFERRED EMBODIMENT

Figure 1:
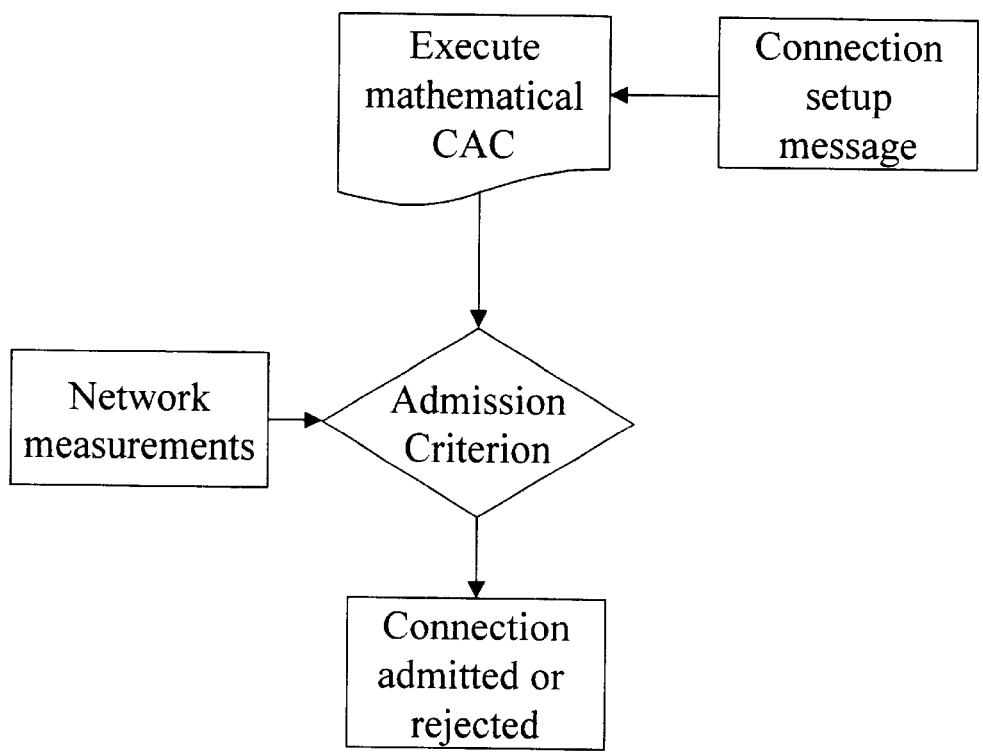
FIG. 1 is a block diagram illustrating a CAC scheme consistent with the principles of the present invention.

Turning to the accompanying drawings, FIG. 1 is a block diagram generally illustrating a CAC scheme of the present invention. The main elements include the set up message, the computation of the EBR, the network measurements and the admission criterion and bandwidth pools.

The set up message is a function of the packet network that is under consideration and usually forms a layer in its protocol stack. The computation of the EBR depends on the traffic expected and the QoS parameter of interest, e.g. loss or delay. The input to the EBR algorithm is the traffic parameters received in the set up message of the signaling protocol. Those parameters usually are tailored to the service offered.

This invention does not make any assumptions about the way the EBR is computed and is designed in a way to work independent of the EBR algorithm used and the QoS parameters of interest.

The CAC function proposed in this invention takes into account the actual utilization per service class on every link of the network The actual utilization is measured as the average load on the link per service class measured on a regular interval basis. Those measurements are usually noisy and would lead to oscillations if applied without smoothing. To smooth the per class average link utilization measurements, a low pass filter in the form of an exponential weighted moving average is proposed. This filter could be of the form $$\mu_{new} = (1-\epsilon) \times \mu_{old} + \epsilon \times m_{new}$$

Where $\mu$ is the smoothed link utilization per service class, $m_{new}$ is the new measurement, and $\epsilon<1$ is a constant that controls the convergence of the low pass filter. Other averaging methods may also be used.

One problem associated with a pure measurement-based CAC is that it is susceptible to admitting a large number of connections during periods where the traffic activity on the link is low. For instance, connections may be established early in the morning, where the load is usually low—see FIGS. 2a and 2b, but the actual traffic peaks several hours later. During those periods of low activity the link measurements would reveal a low link utilization and large number of connections could be admitted. As those connections later turn active, it would be impossible for the network to. guarantee the QoS parameters negotiated at the connection set up phase.

Therefore it is necessary to provide a limiting technique or limiter by which the number of admitted connections could be limited during those periods of time. This objective is achieved by an innovative approach that combines both the measurement-based and mathematical-based CAC (hybrid approach). The hybrid approach allows the limiting of the number of connections that could otherwise be admitted during low activity periods without sacrificing the benefits of a measurement-based CAC. Those benefits could be summarized as follows:

QoS improvement: never accept a call if the link and/or the service class is congested at the moment of the connection arrival.

Efficiency improvement: encourage network operators to aggressively overbook the network, knowing that network measurements will minimize the QoS degradation.

Figure 3A:
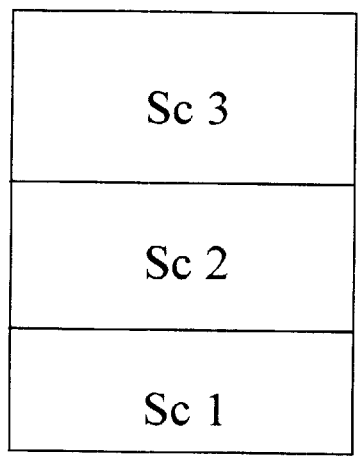
FIGS. 3a and 3b are schematic diagrams illustrating the concept of the bandwidth pools.
Figure 3B:
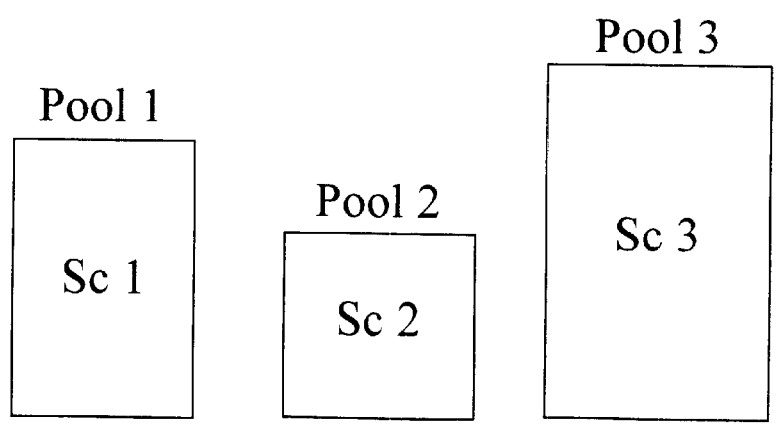

The CAC criterion introduced here utilizes the notion of bandwidth pools where service classes are mapped to different bandwidth pools. The concept of bandwidth pools is an innovative and convenient tool for managing the link bandwidth among a number of service classes for the purpose of the hybrid CAC. FIGS. 3a and 3b show schematics of the bandwidth pools for two cases, respectively. The first case is where all the service classes are mapped to the same pool and the second case is where each service class is mapped to a separate pool. Both cases have their advantages and disadvantages.

The advantage of the first case is that it leads to efficient usage of the link resources, but there is always the risk that the entire link resources could be consumed by a single service class. The second case provides isolation between the different service classes but might lead to a situation where the link resources are idle while connections are being denied admission because the corresponding pool is full. There are two issues related to the bandwidth pools. Those issues are the number of bandwidth pools and the rates assigned to them in relation to the link rate.

Obviously there is no need to create a number of bandwidth pools more than the number of service classes supported. Hence, the number of bandwidth pools will always be less than or equal to the number of service classes supported. The partitioning of the link rate to a number of bandwidth pools should also allow the support of multiple service classes on the same bandwidth pool as in FIG. 3a. The support of multiple service classes on the same bandwidth pool might be desirable for a number of reasons including higher utilization, and easier engineering and network management.

The rates assigned to the different bandwidth pools should be based on the expected traffic pattern of this service class. The sum of the pools rates could be made equal to or, greater, or smaller than the link rate to allow for overbooking or under-booking.

To simplify the discussion, we first assume the case where a single bandwidth pool and a single service class are configured. In this case the admission criterion is of the form $$w_1 \times (\mu + EBR_c < ubf \times pool) \text{ AND } w_2 \times \left( \sum_c EBR_c < obf \times pool \right)$$

The first terms of the above expression accounts for the measured utilization where, w, is a binary provisioned parameter to enable or disable the measurement-based CAC option.

$\mu_{13}$ is the measured utilization of the pool (equals the link utilization in case of a single service class).

Ubf is an under-booking factor and could be viewed as a safety parameter that limits the utilization to a percentage of the provisioned pool (link) capacity. Ideally, this parameter should be designed to be changeable depending on the time of the day to reflect the expected traffic pattern (e.g. ubf=0.2 at night and 0.9 during busy hour). In many ways the ubf could be interpreted as the target utilization of the link during the operation period where the measurement-based portion of the CAC scheme becomes dominant.

Pool is the link capacity.

EBRC is the equivalent bit rate of the incoming connection as was described before.

The target link utilization can be estimated from loss and delay objectives.

The second term accounts for the mathematical-based CAC.

$W_2$ is a binary provisioned parameter to enable or disable the measurement-based CAC. $W_2=0$ may be suitable for the cases where the connections arrival pattern is random throughout the day.

Obf is the pool overbooking parameter, typically in the range 3–10 to account for the interruption of traffic generated by the sources.

An incoming connection is only accepted if both terms of the admission equation are satisfied. FIG. 2b shows the admission region as a function of time and the offered load to the network.

Figure 4:
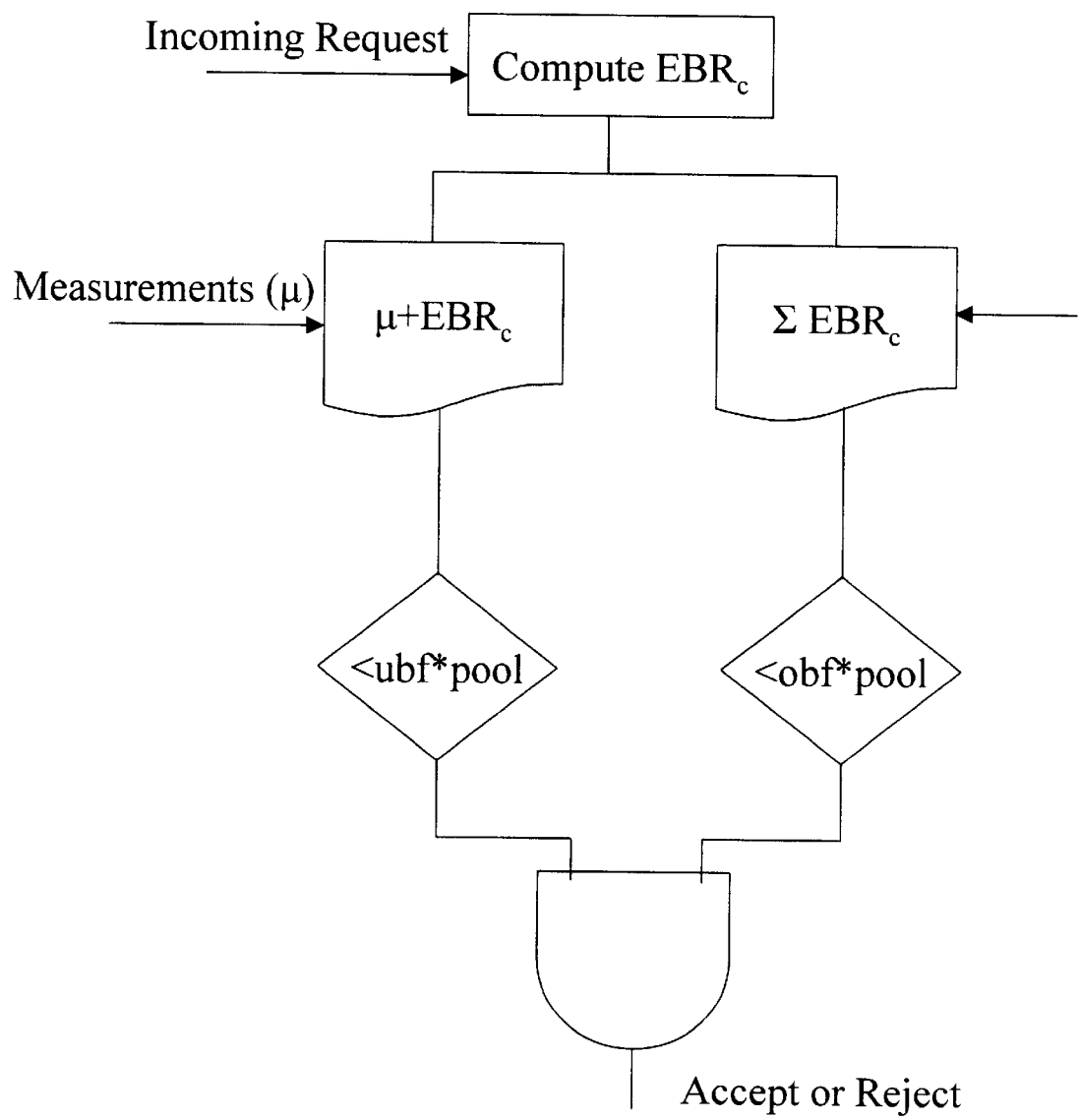
FIG. 4 is a schematic diagram showing the basic steps taken when a new request for admission is received.

FIG. 4 shows the steps taken upon the arrival of a new request to determine if it could be admitted to the network. Upon the arrival of the new request, its $EBR_c$ is calculated based on either the delay or the loss formula as described before. The computed value is then added to the measured pool utilization, $\mu$ and the sum of the $EB_c$ of the connections that have been already admitted to the network The two resulting values are then compared to the ubf*pool and obf*pool respectively. The results of the two comparisons are logically ANDed to decide if the incoming connection could be admitted. Obviously by the proper choice of the weighting parameters, $w_1$ and $w_2$, the CAC procedure reverts to a pure measurement-based CAC, a pure mathematical-based CAC, or a hybrid CAC.

The above admission criterion could be easily extended to the case where multiple pools are supported and where multiple service classes are mapped to the same pool. The generalized admission criterion is of the form:

$$w_1 \times \left( \sum_{sc \in pool} \mu_{sc} + EBR_c < ubf * pool \right) \text{ AND}$$

$$w_2 \times \left( \sum_{sc \in pool} \sum_{c \in sc} EBR_c < obf * pool \right)$$

$\mu_{sc}$ is the sum of the per service class link utilization for all the service classes that are sharing the same bandwidth pool (note that in a single Bandwidth pool $\mu_{sc}$ can be substituted by a single link measurement value, resulting in a simpler switch design).

Pool is the provisioned pool capacity, between 0 and link rate.

Similar to the single pool case, an incoming connection is accepted if and only if both conditions of the above expression are true.

Operation of the Hlybrid CAC

The operation of the hybrid CAC could be illustrated by an example. Without loss of generality, let's assume that the network supports a single class of connections for which its computed EBR is, for example, 5 Mbps. A single pool is assumed and the pool capacity is set equal to the link speed at 150 Mbps. The over-booking factor is set equal to 2 and the under-booking factor, $w_1$, and w2 are all set equal to 1.

As shown in FIGS. 2a and 2b, during a low activity period, e.g. overnight, the network measurements will reveal a very low value for the network utilization, almost 0, hence for an incoming request, the first part of the admission equation will always be satisfied. If we assume that 60 connections are currently admitted to the network but don't show much activity, then the second part of the admission criterion will fail (the total EBR of all connections will be 305 Mbps>obf*pool-capacity) and the new request will be denied. If the number of the admitted connections is less than 60, then the incoming request will be granted.

This part of the example shows that during those periods of time with low activity, the main factor in deciding the admission of the incoming request is the part of the admission criterion related to the mathematical CAC. The inclusion of this part allows the network operator to limit the number of connections admitted to the network during off-peak periods. The same goal could be achieved by changing the factor ubf as a function of the time of the day. Hence during an off-peak period the ubf is set at small value that in effect causes the first part of the admission criterion to fail.

During a busy period, network measurements will reveal a high value for the network utilization. During those periods, an incoming request will only be granted if and only if both parts of the admission criterion are satisfied, i.e. less than 60 connections are in the network and the incoming request is not expected to contribute adversely to the measured utilization. An incoming request might be denied even though the mathematical part of the equation is satisfied, i.e. less than 60 are admitted.

In general, the operation of the hybrid CAC scheme will be governed by two factors. Those are the arrival pattern of the admission requests and the pattern by which connections generate traffic when admitted to the network. Table I shows the different modes of operation of the hybrid CAC scheme for different loading conditions.

As is illustrated in Table I if the calls generated traffic is random and evenly distributed over the day, then the measurement part of the CAC procedure will dominate the operation of the hybrid scheme and is useful in regulating the admission during the busy hour to allow the network to meet its QoS and utilization targets. Mathematical CAC is useful during non-busy hours to limit the number of admitted connections so that their QoS can be met when they turn active during busy hours.

The CAC operation shows that failing to grant a request could be attributed to the failure of the measurement CAC and/or the failure of the mathematical CAC. For proper operation of the CAC procedure and to allow for the appropriate adjusting of the various CAC parameters such as the ubf and the obf, suitable statistics of the CAC performance are needed.

In this invention, and to suit the hybrid nature of the CAC procedure, two performance measures are proposed. Those performance measures are:

The probability that the first part of the admission criterion failed to accept given that a connection is denied.

The probability that the second part of the admission criterion failed to accept given that a connection is denied.

These performance measures can be used in conjunction with other measurements such as the cell loss rate in order to optimize the CAC operation for each environment. For instance when the second part of the admission criterion fails consistently during the normal operation hours, it is advisable to increase the over-booking factor to increase the chance of accepting new flows.

Measurements of the failure probabilities of the two parts of the hybrid CAC could be achieved by a set of three counters. One counter for the total number of requests submitted, and a counter for the number of failures due to each part of the hybrid CAC. The values of the three counters could be downloaded and reset at intervals specified by the network operator. The network operator could use those values for adjusting his choices of the obf and ubf. For instance, if the mathematical part fails too often while the link utilization remains low during the busy hours, then the network operator will have the option to increase the obf hence controlling the upper bound on the number of connections that could be accepted. The ubf could also be adjusted during the time of the day in accordance with the traffic demands to provide additional control on the number of admitted connections.

Relationship to Routing

Figure 5:
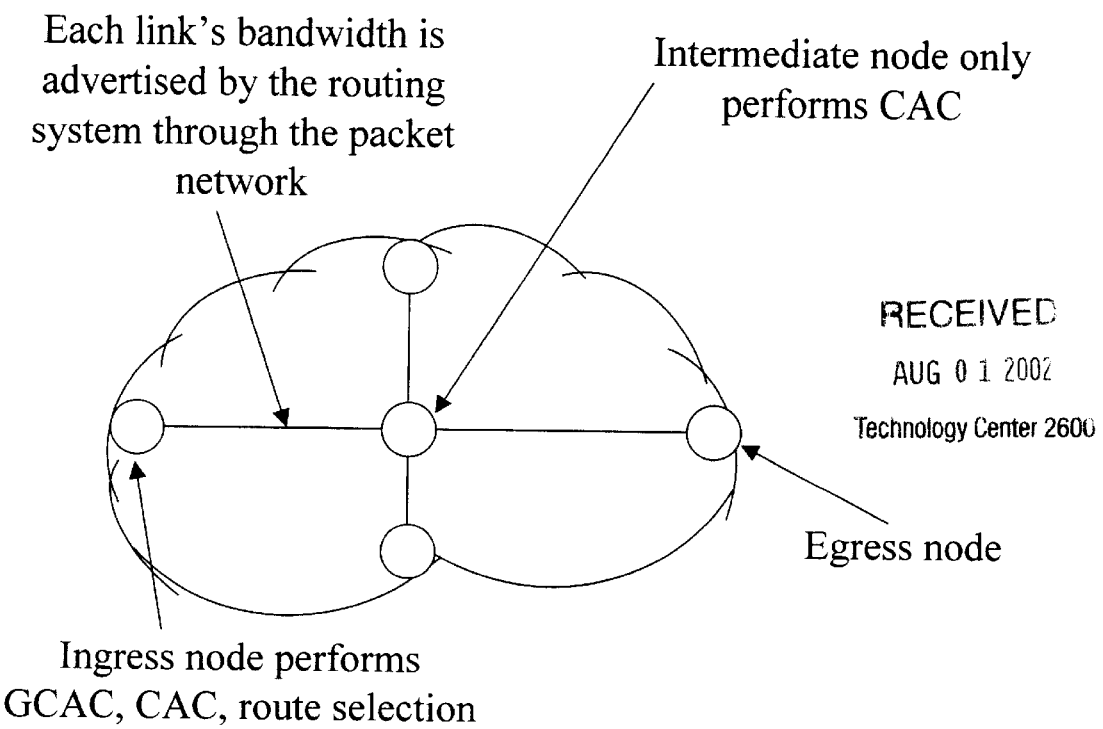
FIG. 5 is a schematic representation illustrating the relationship between CAC and the routing system in a packet network.

The admission criterion needs to be performed on a per link basis. To find an end-to-end path through the network, each link must have the sufficient resources to satisfy the QoS requirements of the incoming flow. Therefore, the CAC function needs to interact with the network routing system. This interaction is usually in the form making use of the link state information advertised by the routing protocol. FIG. 5 shows the distribution of the functionality among the source node, intermediate nodes, and intermediate links.

With the introduction of the hybrid CAC scheme and its measurement part, it is necessary to define the link state information (LSI) that will be advertised by the routing protocol. The LSI per service class should combine both parts of the hybrid CAC. The proposed per class LSI is of the form IF $w_1=1$ AND $w_2=1$ THEN $$LSI_{sc} = MIN\left\{\left(ubf \times pool - \sum_{sc \in pool} \mu_{sc}\right), \left(obf \times pool - \sum_{sc \in pool}\sum_{c \in sc} EBR_c\right)\right\}$$

IF $w_1=1$ AND $w_2=0$ THEN $$LSI_{sc} = \left\{\left(ubf \times pool - \sum_{sc \in pool} \mu_{sc}\right)\right\}$$

IF $w_1=0$ AND $w_2=1$ THEN $$LSI_{sc} = \left\{\left(obf \times pool - \sum_{sc \in pool}\sum_{c \in sc} EBR_c\right)\right\}$$

Figure 6A:
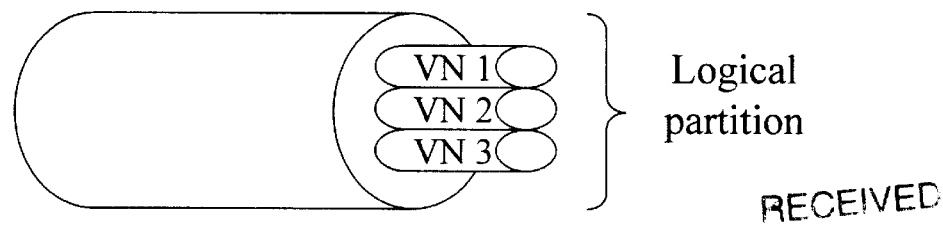
FIGS. 6a and 6b illustrate the concept of virtual networks.
Figure 6B:
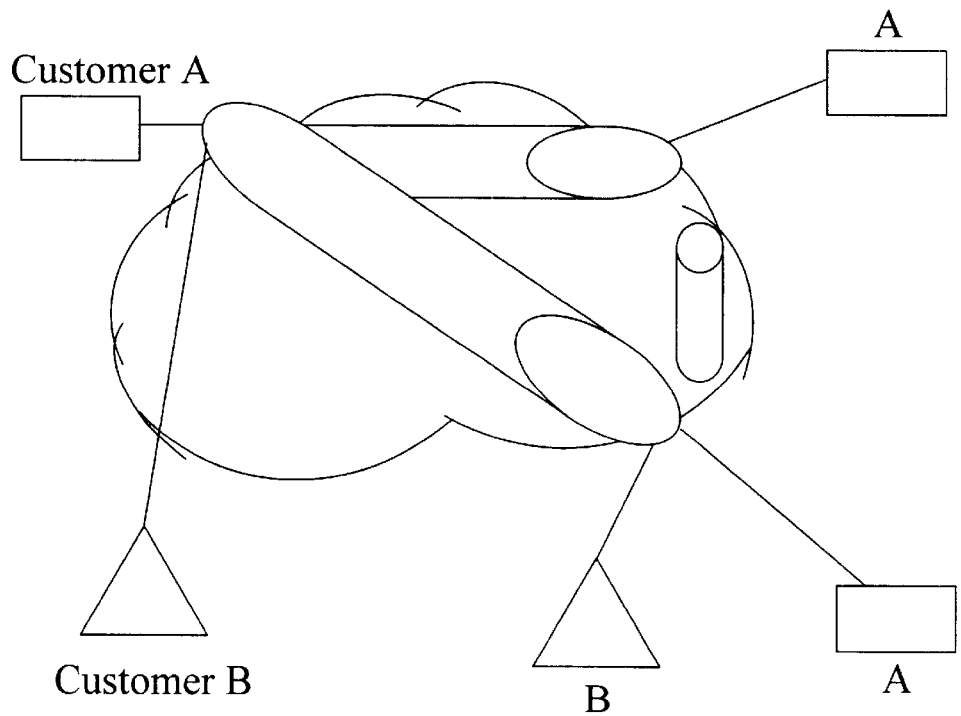

$LSI_{sc}$ defines the available bandwidth for this service category on a particular network link. Therefore it ensures that the advertised bandwidth will not exceed the available capacity as calculated by either the dynamic or the mathematical CAC methods. Virtual Network CAC In today's networking environment, VNs (virtual networks) play an increasingly important role. FIG. 6a illustrates the partition of the nodal resources among a to number of virtual networks. This partition of resources is only logical to allow for efficient utilization of the network resources. FIG. 6b shows how a number of virtual networks that belong to different organizations are supported on the same networking infrastructure that is owned by a single network provider. Examples of these services are the VPI (Virtual Private Intranet) service in the IP-based networks and the VP (virtual path) in ATM-based networks.

The offering of these classes of services requires a hierarchy of CAC. At the first level the CAC procedure is performed to decide on the acceptance of a new VN to the collection of the already existing VNs. The result of the CAC procedure at this level is the computation of an $EBR_{VN}$ to a particular VN. This level of CAC is performed by the VN service provider backbone network and is similar to the hybrid scheme proposed in this invention with the link rate being used as the service capacity.

The computed $EBR_{VN}$ could be viewed as the rate assigned to the customer of the VN service. The need to manage this amount of resources is also needed by the organization that contracted the VN service from a carrier. To manage these resources, the second level of CAC is needed to control the amount of traffic admitted to the VN. In this invention we propose that the VN resources be managed in the same way proposed here. CAC and bandwidth pools are needed as described before.

The implementation of the CAC procedure for a VN requires the determination of the serving capacity needed to compute the $EBR_c$ for the incoming connections. Service capacity is defined as the capacity available to a class of traffic after taking into account the effect of the other classes. Calculation of the serving capacity is necessary to compute various values in the EBR formula, e.g. the computation of $Pr[W>0]$ in the EGH formulae. In this invention, we propose the VN peak rate for this purpose although other schemes may be used.

The admission criterion for admitting or rejecting the incoming connections is the same as the criterion described before and is of the form $$w_1 \times (\mu_{VN} + EBR_c < ubf \times EBR_{VN}) \text{ AND}$$

$$w_2\left(\sum_{c \in VN} EBR_c < obf \times EBR_{VN}\right)$$

An incoming connection is admitted to the VN network if and only if the above two conditions are satisfied. In the above admission criterion, $EBR_{VN}$ is used in place of the link rate for the CAC procedure. It is also assumed that bandwidth pools are not employed here and all service classes are mapped to a single pool.

For the cases where bandwidth pools are employed and it is possible to measure the per service class VN utilization, the above admission criterion could be modified as $$w_1 \times \left(\sum_{sc \in pool} \mu_{VN-sc} + EBR_c < ubf \times pool_{VN}\right) \text{ AND}$$

$$w_2 \times \left(\sum_{sc \in pool}\sum_{c \in sc} EBR_c < obf \times pool_{VN}\right)$$

$pool_{VN}$ is the amount of VN resources reserved for a particular bandwidth pool. The options for defining the bandwidth pools would follow the options illustrated in FIGS. 3a and 3b.

Figure 7A:
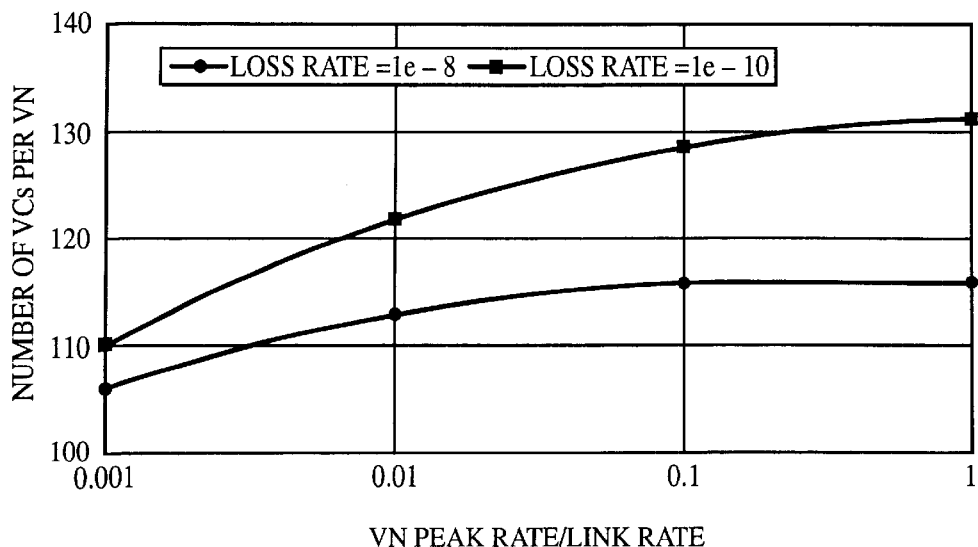
FIG. 7a shows a graphical representation of the number of admitted connections per virtual network as a function of the virtual network peak rate.
Figure 7B:
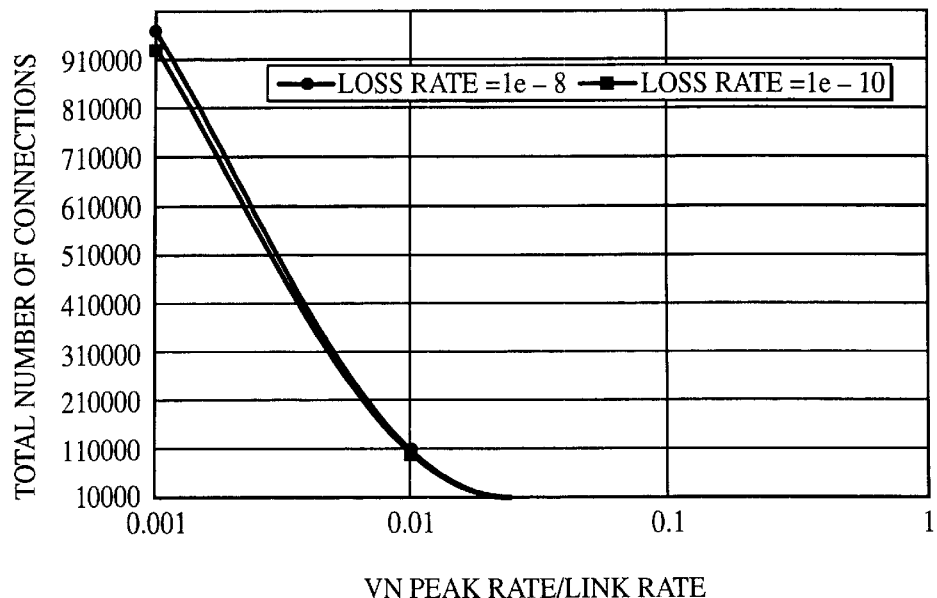
FIG. 7b shows a graphical representation of the total number of admitted connections as a function of the virtual network peak rate.

The operation of the VN CAC is illustrated by an example. FIGS. 7a and 7b show the number of connections admitted, by the mathematical CAC, per VN for different packet loss rate objectives and as a function of the VN peak rate expressed as a ratio of the link rate. FIGS. 7a and 7b are obtained using the EGH formula presented before. The parameters used to generate the graph are:

VN Parameters:

Peak Rate=variable as a ratio of the link rate

Average rate=0.1 of the peak rate

Burst size=2650 bytes

VC Parameters:

Peak rate=0.01 of the VN peak rate

Average rate=0.1 of the VC peak rate

Burst size=500 bytes

Link Parameters:

Link rate=OC-3

Buffer size=150 Kbytes

FIG. 7a shows the number of connections per VN increase as the loss objective becomes more stringent. However the total number of admitted VNs decreases and hence the total number of admitted connections for the whole link as shown in FIG. 7b.

The measurement part of the VN CAC should be invoked in addition to the number of connections determined by in FIGS. 7a and 7b by the mathematical CAC to decide the final outcome of the hybrid CAC procedure.

While the foregoing description and drawings represent the preferred embodiments of the present invention, it will be understood that various changes and modifications may be made without departing from the spirit and scope of the present invention.

TABLE I

| | | Call Arrival Pattern | | |
| --- | --- | --- | --- | --- |
| | | Random | Busy Hour | Off-peak Hours |
| Traffic Volume Generated by Calls | Random | Measurement CAC | Measurement CAC | Measurement CAC |
| | Focused in Busy Hours | Hybnd CAC (or change ubf) | Measurement CAC | Hybnd CAC (or change ubf) |

What is claimed is:

1. An adaptive apparatus for regulating connection admission of traffic for networks, comprising: a limiter of a volume of traffic admitted to a network through a connection admission control (CAC) procedure, the limiter being configured to base the connection admission control procedure at least in part both on a pure measurement CAC that is solely based on measurements of actual traffic levels on the network and on a pure mathematical-based CAC that is solely dependent on user-supplied traffic parameters, thereby combining both types of the CAC to form a hybrid admission criterion, and an adjuster being arranged to cause the pure measurement-based CAC of the hybrid admission criterion to dominate over the mathematical-based CAC of the hybrid admission criterion in regulating the CAC procedure on a network while the call generated traffic is random and evenly distributed throughout a day.

2. An adaptive method for regulating connection admission of traffic for networks, comprising the steps of:

limiting a volume of traffic admitted to a network through a connection admission control (CAC) procedure;

basing the connection admission control procedure at least in part on both a pure measurement CAC that is solely based on measurements of actual traffic levels on the network and on a pure mathematical-based CAC that is solely dependent on user-supplied traffic parameters, thereby combining both types of the CAC to form a hybrid admission criterion; and reverting the hybrid admission criterion to either the pure mathematical-based CAC, the pure measurement-based CAC, or a mix of both by adjusting values of two binary weight factors.

3. A method as in claim 2, further comprising the step of interacting the CAC procedure with a routing scheme of the network by making use of a link state information advertised by a routing protocol.

4. A method as in claim 2, further comprising managing link resources for CAC by regulating the CAC procedure based on capacities assigned to service bandwidth pools that are defined for different services offered by the network.

5. A method as in claim 2, wherein the steps of limiting and basing take place on a virtual network (VN) environment.

6. An adaptive method for regulating connection admission of traffic for networks, comprising the steps of:

limiting a volume of traffic admitted to a network through a connection admission control (CAC) procedure; and basing the connection admission control procedure at least in part on both a pure measurement CAC that is solely based on measurements of actual traffic levels on the network and on a pure mathematical-based CAC that is solely dependent on user-supplied traffic parameters, thereby combining both types of the CAC to form a hybrid admission criterion, the limiting and basing steps occurring on a network causing the pure measurement-based CAC of the hybrid admission criterion to be arranged to dominate over the mathematical-based CAC of the hybrid admission criterion in regulating the CAC procedure while the call generated traffic is random and evenly distributed throughout the day.

7. An adaptive method for regulating connection admission of traffic for networks, comprising the steps of:

limiting a volume of traffic admitted to a network through a connection admission control (CAC) procedure; and basing the connection admission control procedure at least in part on both a pure measurement CAC that is solely based on measurements of actual traffic levels on the network and on a pure mathematical-based CAC that is solely dependent on user-supplied traffic parameters, thereby combining both types of the CAC to form a hybrid admission criterion, the limiting and basing steps occurring over a network causing the pure measurement-based CAC of the hybrid admission criterion to dominate over the mathematical-based CAC of the hybrid admission criterion in regulating the CAC procedure during a busy hour on the network that has more call generated traffic than at other times.

8. An adaptive method for regulating connection admission of traffic for networks, comprising the steps of:

limiting a volume of traffic admitted to a network through a connection admission control (CAC) procedure; and basing the connection admission control procedure at least in part both on a pure measurement CAC that is solely based on measurements of actual traffic levels on the network and on a pure mathematical-based CAC that is solely dependent on user-supplied traffic parameters, thereby combining both types of the CAC to form a hybrid admission criterion, the limiting and basing steps occurring during a non-busy hour on the network during which call generated traffic demand is lower than at other times, causing the pure mathematical-based CAC of the hybrid admission criterion to dominate over the measurement-based CAC of the hybrid admission criterion in regulating the CAC procedure during the non-busy hours.

9. An adaptive method for regulating connection admission of traffic for networks, comprising the steps of:

limiting a volume of traffic admitted to a network through a connection admission control (CAC) procedure;

basing the connection admission control procedure at least in part both on a pure measurement CAC that is solely based on measurements of actual traffic levels on the network and on a pure mathematical-based CAC that is solely dependent on user-supplied traffic parameters, thereby combining both types of the CAC to form a hybrid admission criterion; and determining performance measures as to which one of two portions of the hybrid criterion has a probability of failing to accept a request for connection admission through the CAC procedure, the portions being the measurement-based CAC and the mathematical-based CAC, respectively.

10. A method as in claim 9, wherein the step of determining is based on three counters, a first of the counters being a total number of requests submitted for connection admission, and a second and third of the counters being a number of failures respectively due to each of the portions of the hybrid CAC.

11. A method as in claim 9, further comprising varying factors in the mathematical-based CAC in response to the step of determining and in accordance with traffic demands to adjust a number of admitted connections.

12. An adaptive apparatus for regulating connection admission of traffic for networks, comprising: a limiter of a volume of traffic admitted to a network through a connection admission control (CAC) procedure, the limiter being configured to base the connection admission control procedure at least in part both on a pure measurement CAC that is solely based on measurements of actual traffic levels on the network and on a pure mathematical-based CAC that is solely dependent on user-supplied traffic parameters, thereby combining both types of the CAC to form a hybrid admission criterion, and an adjuster being arranged to cause the pure measurement-based CAC of the hybrid admission criterion to dominate over the mathematical-based CAC of the hybrid admission criterion in regulating the CAC procedure during a busy hour on the network during which traffic demand is greater than at other times.

13. An adaptive method for regulating connection admission of traffic for networks, comprising the steps of:

limiting a volume of traffic admitted to a network through a connection admission control (CAC) procedure; and basing the connection admission control procedure at least in part on a pure measurement CAC that is solely based on measurements of actual traffic levels on the network, the steps of limiting and basing taking place on a virtual network (VN) environment, the CAC procedure being arranged so that a number of connections per VN increases as a loss objective becomes more stringent, but a total number of admitted VNs decreases and thus a total number of admitted connections for an entire link decreases.

14. An adaptive apparatus for regulating connection admission of traffic for networks, comprising: a limiter of a volume of traffic admitted to a network through a connection admission control (CAC) procedure, the limiter being configured to base the connection admission control procedure at least in part both on a pure measurement CAC that is solely based on measurements of actual traffic levels on the network and on a pure mathematical-based CAC that is solely dependent on user-supplied traffic parameters, thereby combining both types of the CAC to form a hybrid admission criterion, and an adjuster being arranged to cause the pure measurement-based CAC of the hybrid admission criterion to dominate over the mathematical-based CAC of the hybrid admission criterion in regulating the CAC procedure during a busy hour on the network during which traffic demand is greater than at other times.

15. An adaptive apparatus for regulating connection admission of traffic for networks, comprising: a limiter of a volume of traffic admitted to a network through a connection admission control (CAC) procedure, the limiter being configured to base the connection admission control procedure at least in part on a pure measurement CAC that is solely based on measurements of actual traffic levels on the network, the limiter being configured to act on a virtual network (VN) environment, and an adjuster being arranged so that a number of connections per VN increases as a loss objective becomes more stringent, but a total number of admitted VNs decreases and thus a total number of admitted connections for an entire link decreases.

16. An adaptive apparatus for regulating connection admission of traffic for networks, comprising: a limiter of a volume of traffic admitted to a network through a connection admission control (CAC) procedure, the limiter being configured to base the connection admission control procedure at least in part both on a pure measurement CAC that is solely based on measurements of actual traffic levels on the network and on a pure mathematical-based CAC that is solely dependent on user-supplied traffic parameters, thereby combining both types of the CAC to form a hybrid admission criterion, and an adjuster configured to revert the hybrid admission criterion to either the pure measurement-based CAC, the pure mathematical-based CAC, or a mix of both by adjusting values of two binary weight factors.

17. An apparatus as in claim 16, further comprising a manager of link resources for CAC through regulation of the CAC procedure based on capacities assigned to service bandwidth pools that are defined for different services offered by the network.

18. An apparatus as in claim 16, wherein the limiter is configured to act on a virtual network (VN) environment.

19. An apparatus as in claim 16, further comprising an interactor of the CAC procedure with a routing scheme of the network by making use of a link state information advertised by a routing protocol.

20. An adaptive apparatus for regulating connection admission of traffic for networks, comprising: a limiter of a volume of traffic admitted to a network through a connection admission control (CAC) procedure, the limiter being configured to base the connection admission control procedure at least in part both on a pure measurement CAC that is solely based on measurements of actual traffic levels on the network and on a pure mathematical-based CAC that is solely dependent on user-supplied traffic parameters, thereby combining both types of the CAC to form a hybrid admission criterion; and a determiner of performance measures as to which of two portions of the hybrid criterion has a probability of failing to accept a request for connection admission through the CAC procedure, the two portions being the measurement-based CAC and the mathematical-based CAC, respectively.

21. An apparatus as in claim 20, wherein the determiner is configured to base determination on three counters, a first of the counters being a total number of requests submitted for connection admission, and a second and third of the counters being a number of failures respectively due to each of the portions of the hybrid CAC.

22. An apparatus as in claim 21, wherein the determiner is configured to vary factors in the mathematical-based CAC in response to the determination and in accordance with traffic demands to adjust a number of admitted connections.

* * * * *